INVENTOR
*Vernon E. Kidd*

United States Patent Office 3,070,926
Patented Jan. 1, 1963

3,070,926
HONING TOOL
Vernon E. Kidd, 238 W. Sayer St., San Antonio, Tex.
Filed May 31, 1961, Ser. No. 113,753
3 Claims. (Cl. 51—184.1)

This invention relates generally to hand tools, and more specifically to a honing device for truing external cylindrical surfaces.

The removal of score marks and grooves on bearing surfaces is generally recognized as a machining operation. In the case of crank shafts and other journaled bearings, this operation involves considerable dismantling of the engine or machine, and much time must be spent in setting up the part for conventional honing and truing procedures. My invention is directed towards providing a simple tool which may be mounted about the scored bearing whilst the component remains mounted in the machine or engine, thus avoiding the high cost and extensive time involved in removing the faulty part and having the same repaired on expensive machinery customarily used for such purposes. This device is not intended to supercede the conventional machine used for honing and grinding purposes, but is intended for supplementing such machines and enabling the satisfactory fitting of inserts and bearings and their repair.

It is therefore a primary object of this invention to provide a simple low cost tool which may be mounted about any cylindrical bearing surface for the purpose of removing grooves and scores and like imperfections, or for the purpose of correcting out of roundness that may be experienced in the bearing due to wear.

It is a further object of this invention to provide a device of the above class which is readily adjustable for the honing of bearings of differing diameter, and wherein the device may be dismantled such that assembly is possible around a shaft which is mounted in a machine and closed at each end.

Briefly, my invention involves the provision of a ring which is divided into four equal quadrants, each quadrant being adjustably connected to the adjacent quadrant by means of an adjustment screw mounted intermediate the ends of the quadrant. Extending centrally and radially through each quadrant of the ring is a honing stone which is adjustably mounted to extend inwardly of the ring. The four quadrants of the ring are assembled about the bearing which it is desired to hone, and the necessary adjustments are made such that the honing stone project inwardly of the ring and embrace the surface of the bearing. Honing is accomplished by rotating the ring back and forth about the shaft and moving the same axially thereof.

A full understanding of the details of this invention together with further advantages, will become apparent by reference to the following detailed description of a preferred embodiment thereof, taken in conjunction with the attached drawings wherein.

Similar reference characters indicate corresponding parts throughout the several views in the drawings.

Figure 1:
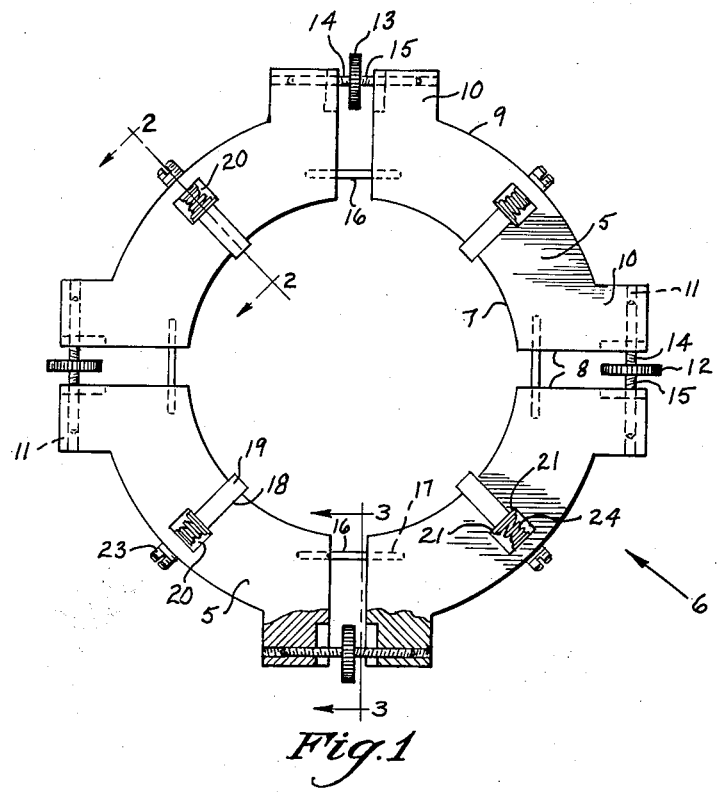
FIG. 1 is a plan view of the assembled honing device which comprises my invention.
Figure 2:
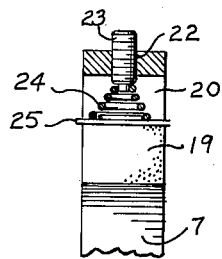
FIG. 2 is a cross sectional view taken through one of the segments along the line 2—2 of FIG. 1.
Figure 3:
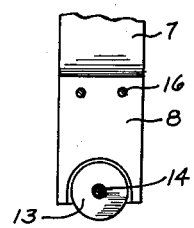
FIG. 3 is a view taken along the line 3—3 of FIG. 1.

Referring now to the drawings in detail, the numeral 5 represents an arcuate segment of the honing ring indicated generally at 6. Each segment has a circular inner surface 7 which terminates at each end of the segment with a radial end face 8, the segment further has a circular outer surface 9 which terminates at each end with a flanged portion 10 projecting outwardly of the segment. Transverse holes 11 are formed through each of the flanged portions 10 and are adapted to align with each other when the segments are arranged in the form of a ring. The holes are internally threaded and receive the ends of a knurled adjustment screw 12. The adjustment screw consists of a central disc 13 which is disposed between adjacent arcuate segments and is adapted to project beyond the ends of the flanged portions 10. Extending axially of the disc is a left hand and a right hand threaded stud 14 and 15 respectively. The studs threadably engage in the holes 11 such that rotation of the disc will cause the end faces 8 to close or open depending on the direction of rotation of the disc. A guide pin 16 is mounted to extend normally from one of the end faces 8 and is adapted to slideably engage in a hole 17 formed in the opposite and adjacent end surface. A slot 18 extends transversely and centrally with respect to the surface 7 of each arcuate segment and is adapted to slideably receive a honing stone 19 in a radially spring loaded manner. A rectangular hole 20 extends normally through the segment at the innermost end of the slot 18 and is formed with a width greater than that of the slot, so as to provide landings 21 adjacent the slot. A threaded hole 22 extends through the outer surface 9 of the segment into the rectangular hole 20 and is adapted to receive a grub screw 23 which cooperates at its inner end with a conical compression spring 24. Each honing stone 19 has a plate 25 secured to the inner end which is adapted to locate within the square hole 20 and bear at its outer edges against the landings 21, thus preventing the stone from being released inwardly through a slot 18 by the action of the compression spring 24.

The operation of this device will be quite apparent to those skilled in the art. If the bearing requiring grinding or truing has an open end, the device may be retained in an assembled manner and slipped into position over the bearing. The width of the ring should be less than that of the bearing such that the ring may be rotated back and forth around the bearing and also axially of the bearing to ensure even and constant wear on the honing stones. When working on confined areas such as on the crank shaft, the ring must be parted at diametrically opposite points and then assembled together about the bearing. The pressure exerted by the stones on the bearing surface can be adjusted by means of the grub screws 23, and further by turning of the threaded studs 14.

Having described the invention in a preferred form, it will be appreciated that some modifications may be made to the precise configuration, without departing from the scope or spirit of the invention, as defined by the following claims.

I claim:

1. A hand operated honing device for truing bearings, and comprising, four arcuate segments adapted to removably combine with each other to form a ring, said segments having radially extending end faces, adjustment means cooperating through the end faces for varying the distance between adjacent end faces, slots formed radially and transversely into the centre of each segment from the inner side, honing stones mounted for radial movement inwardly and outwardly of the slots, springs urging the stones radially through the slots towards the centre of the ring and guide pins normally extending between adjacent end faces, said pins being slideably received at their ends in holes formed in said end faces.

2. A hand operated honing device according to claim 1, wherein, said adjustment means comprises a knurled disc disposed intermediate the end faces of adjacent arcuate segments, left and right hand threaded studs projecting axially from opposite sides of the disc, said studs threadably engaging in holes formed into the opposing end faces.

3. A hand operated honing device according to claim 1, wherein, said honing stones have a plate secured to one end, a square hole extending normally through each arcuate segment communicating with the inner ends of the slots, said plates locating within the square holes and preventing movement of the stone outwardly through the slots, one of said compression springs mounted within the rectangular hole and urging against the plate, said springs adjusted in compression by grub screws extending through the outer surface of the segment.

References Cited in the file of this patent
UNITED STATES PATENTS

| | | |
|---|---|---|
| 1,370,141 | McNicholas | Mar. 1, 1921 |
| 1,729,288 | Harrell | Sept. 24, 1929 |
| 2,001,497 | Lawhorn et al. | May 14, 1935 |
| 2,162,187 | Tharp | June 13, 1939 |
| 2,179,465 | Blazek | Nov. 7, 1939 |
| 2,291,164 | Law | July 28, 1942 |
| 2,382,642 | Klinglesmith | Aug. 14, 1945 |
| 2,603,920 | Wagstaff | July 22, 1952 |
| 2,865,150 | Fuglie | Dec. 23, 1958 |